(12) United States Patent
Nelson et al.

(10) Patent No.: US 8,091,191 B2
(45) Date of Patent: Jan. 10, 2012

(54) COMPLETE MACHINING CENTER AND METHOD

(75) Inventors: Anju Nelson, Orlando, FL (US); Daniel Nelson, Orlando, FL (US)

(73) Assignee: Anju Nelson, Orlando, FL (US)

( * ) Notice: Subject to any disclaimer, the term of this patent is extended or adjusted under 35 U.S.C. 154(b) by 787 days.

(21) Appl. No.: 12/220,065

(22) Filed: Jul. 22, 2008

(65) Prior Publication Data

US 2009/0293251 A1  Dec. 3, 2009

Related U.S. Application Data

(60) Provisional application No. 60/963,247, filed on Aug. 6, 2007.

(51) Int. Cl.
| | |
|---|---|
| *B23P 23/00* | (2006.01) |
| *B23Q 1/54* | (2006.01) |
| *B23B 15/00* | (2006.01) |
| *B23B 3/12* | (2006.01) |
| *B23B 11/00* | (2006.01) |
| *B23C 1/14* | (2006.01) |

(52) U.S. Cl. ........... 29/27 C; 29/38 B; 29/563; 29/33 P; 409/168; 409/224

(58) Field of Classification Search .................. 29/27 R, 29/27 C, 38 B, 38 A, 563, 33 P; 409/168, 409/224, 221, 165; 82/122, 124; 408/23
See application file for complete search history.

(56) References Cited

U.S. PATENT DOCUMENTS

| | | | | |
|---|---|---|---|---|
| 4,529,342 | A | * | 7/1985 | Babel ............................ 409/224 |
| 4,951,376 | A | * | 8/1990 | Grund ............................ 29/27 C |
| 5,058,261 | A | * | 10/1991 | Kitamura ....................... 29/27 C |
| 5,083,485 | A | * | 1/1992 | Link et al. ...................... 82/124 |
| 5,117,552 | A | * | 6/1992 | Babel ............................. 483/36 |
| 5,351,376 | A | * | 10/1994 | Kitamura ....................... 29/27 C |
| 5,439,431 | A | * | 8/1995 | Hessbruggen et al. ......... 483/14 |
| 5,452,502 | A | * | 9/1995 | Walter et al. ................... 29/38 B |
| 5,738,564 | A | * | 4/1998 | Helle et al. ...................... 451/11 |
| 5,964,016 | A | * | 10/1999 | Ito et al. ......................... 29/27 C |
| 6,120,222 | A | * | 9/2000 | Hiramoto et al. .............. 409/134 |
| 6,224,462 | B1 | * | 5/2001 | Yokoyama et al. .............. 451/10 |
| 2005/0271488 | A1 | * | 12/2005 | Liechti et al. ................. 409/221 |
| 2009/0290947 | A1 | * | 11/2009 | Kitamura ...................... 409/221 |

FOREIGN PATENT DOCUMENTS

| | | | |
|---|---|---|---|
| JP | 05-008136 A | * | 1/1996 |
| JP | 08-155768 A | * | 6/1996 |

OTHER PUBLICATIONS

Machine Translation JP-08-155768, which JP '768 was published Jun. 1996.*

* cited by examiner

*Primary Examiner* — Erica E Cadugan

(57) ABSTRACT

A complete machining center has a horizontal machine bed (1) with a vertical-axis trunnion (2) pivotal horizontally with computer-coordination proximate a first-end portion (3) and a traveling tool column (4) with computer-coordinated horizontal X and Y axes and vertical Z tool travel on a compound slide (6) proximate a second-end portion (5) for horizontal access of a cutting tool (12) on the traveling tool column to work pieces on a work-piece rotator (10) and for horizontal access of the cutting tool to work pieces on a vertical-axis milling table (38), either of which are positioned on the horizontally pivotal vertical-axis trunnion (2). A work-piece changer (31) is provided for optionally manual or computer-coordinated work-piece setup, setup reversing and finished-work-piece removal.

16 Claims, 12 Drawing Sheets

FIG. 7
FIG. 8
FIG. 9
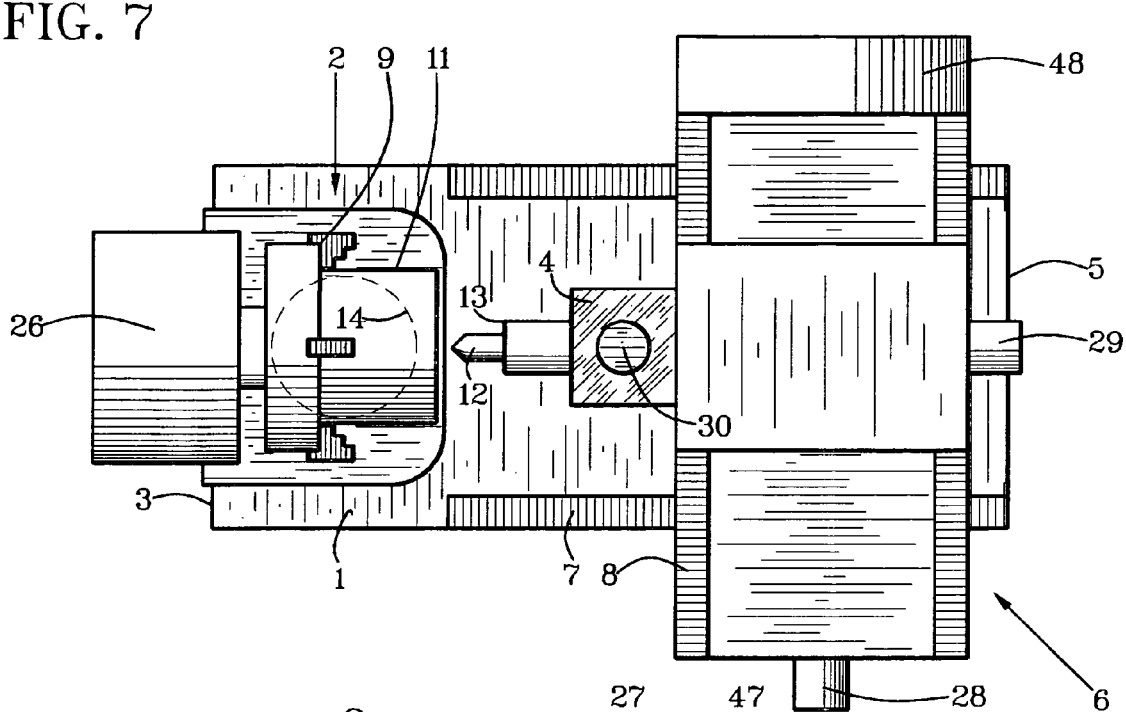
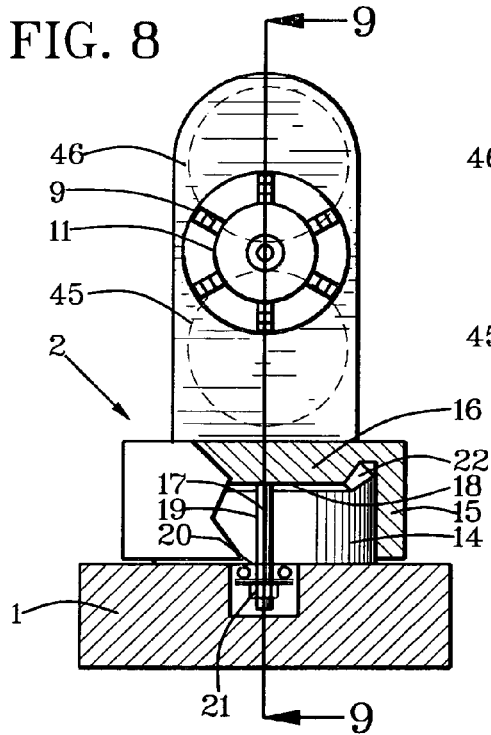

FIG. 10
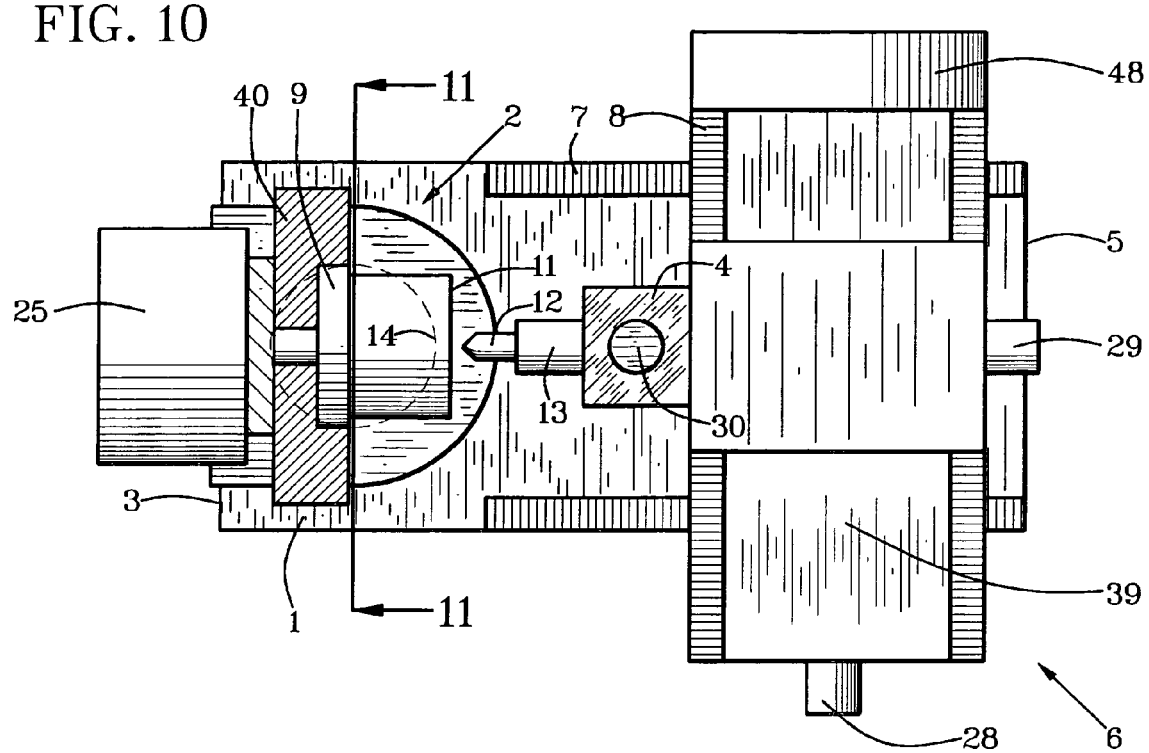
FIG. 11
FIG. 12
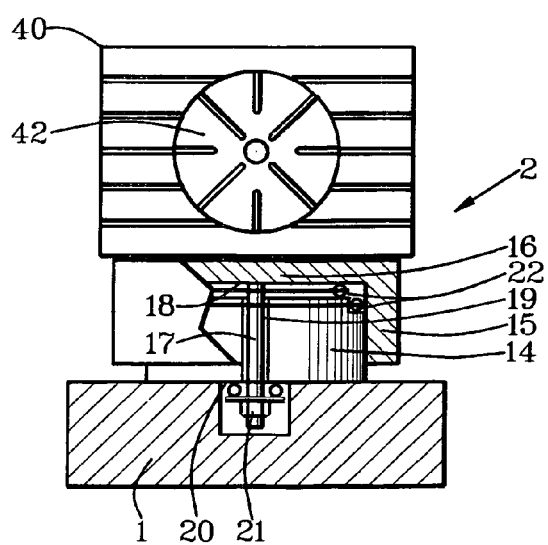

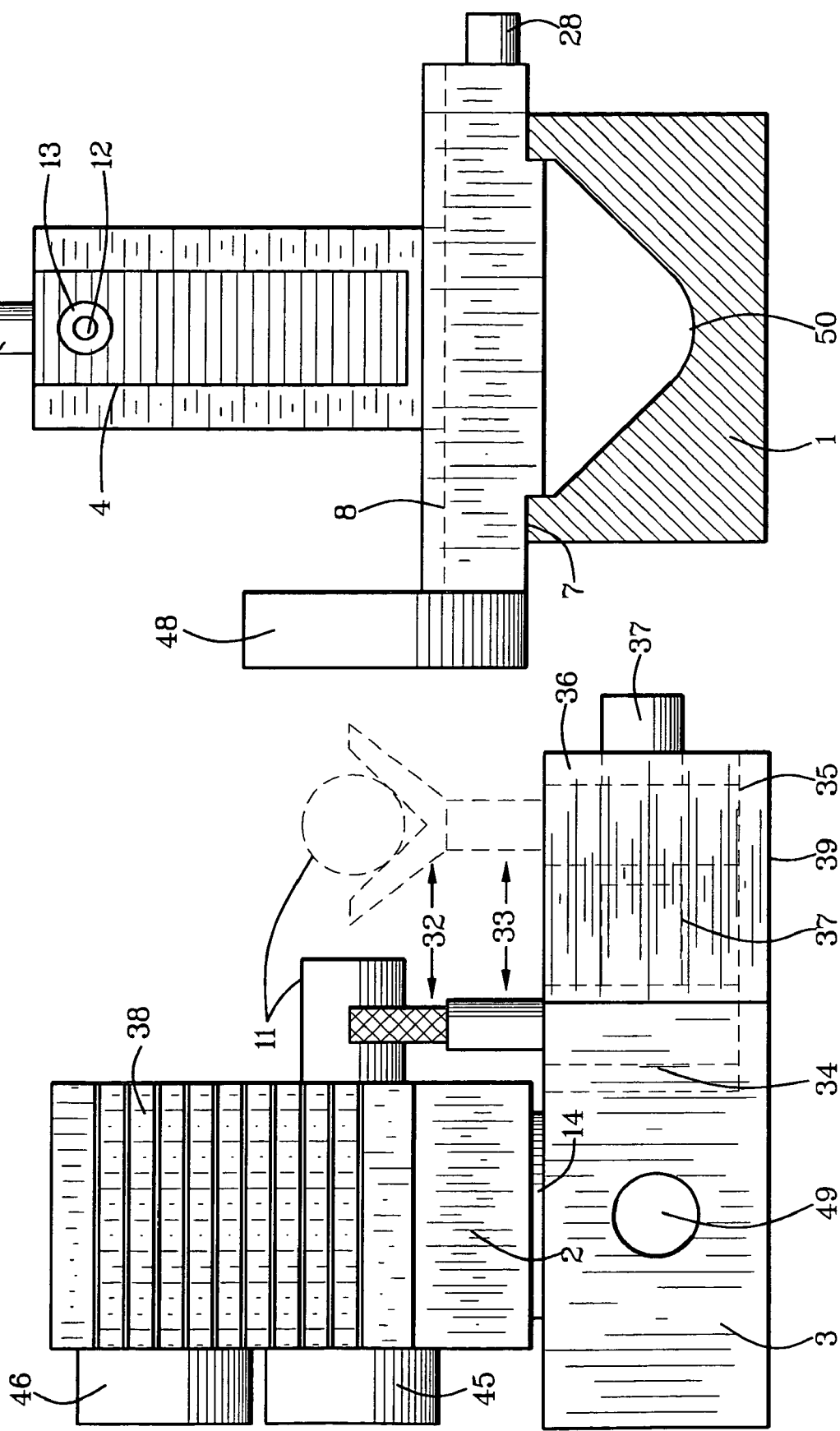

COMPLETE MACHINING CENTER AND METHOD

This application claims the benefit of U.S. Provisional Patent Application titled ALL TASKS AND ALL SIDES MACHINING CENTER, filed by the same inventive entity, Anju Nelson and Daniel Nelson, on Aug. 6, 2007 and having Provisional Application No. 60/963,247.

BACKGROUND OF THE INVENTION

1. Field of the Invention

This invention relates to a complete machining center for all-tasks and all-sides machining with a vertical-axis trunnion for horizontally pivotal positioning of lathe, mill, rotary-table or fixed mill-work pieces for horizontal access by tools on a horizontally traveling tool column for up to six-axes positioning of live or fixed tooling and having an automated work-piece reverser, loader and unloader for full automation and selectively manual machining.

2. Relation to Prior Art

There are known turning centers, vertical machining centers and horizontal machining centers that facilitate multiple-tasks and al l-sides machining. Present turning centers employ sub-spindle chuck-changing to facilitate all-sides machining but lack in milling capability. Vertical milling centers have horizontal-axis trunnions and horizontal milling centers provide various rotary-table setups to facilitate all-sides machining, but lack in turning capacity. None are capable of providing high-precision, single-setup machining for all-sides turning, milling, grinding, drilling, threading and shaping tasks with automatic loading of raw stock and unloading of finished parts inexpensively, conveniently and rapidly in a manner taught by this invention. In addition to circular machining, non-circular and non-rotatable work pieces can be machined with improved versatility, accuracy and automation on select forms of vertical milling tables which can be attached permanently or detachably to this complete machining center. The vertical milling tables function like horizontal-mill tombstones, but are much more versatile and convenient.

Known turning centers and milling centers require special time-consuming, expensive and accuracy-risking setups to accomplish the high quality and versatility of work that this one machine can accomplish routinely, inexpensively and conveniently with a single setup. With one quick and easy setup of a workpiece, this one machine allows complete machining required previously by two or more machines with two or more time-consuming and error-prone setups. Also, tool holders and cutters can be less expensive than for most present multi-task turning centers and milling centers. There are no known comparable machining centers. This is a complete CNC or selectively manual machining center.

Related but different prior art includes the following patents:
U.S. Pat. No. 6,120,222 by Hiramoto et al., 2,000.
U.S. Pat. No. 5,439,431 by Hessbruggen et al, 1995.
U.S. Pat. No. 5,117,552 by Babel, 1992.
U.S. Pat. No. 5,083,485 by Link et al, 1992.

SUMMARY OF THE INVENTION

Objects of patentable novelty and utility taught by this invention are to provide a complete machining center which:
eliminates need for all other types of CNC and manual material-cutting machines by doing the work of turning centers, vertical machining centers, horizontal machining centers and grinding centers better faster, more automatically, more conveniently, more accurately, more versatilely and less expensively for machining all sides of work pieces with this one machine;
can decrease all presently required manual labor from positioning of raw stock to conveyance of finished products for all-machining tasks on all sides of work pieces;
decreases need to outsource for cheap labor;
can provide CNC automated all-sides milling, turning, grinding, drilling, shaping, threading and de-burring tasks with up to six axes selectively; and
can automatically load raw stock and unload finished parts.

This invention accomplishes these and other objectives with a complete machining center having a horizontal machine bed (1) with a vertical-axis trunnion (2) pivotal horizontally with computer-coordination proximate a first end (3) and a traveling tool column (4) with computer-coordinated horizontal X, Y and vertical Z tool travel on a compound slide (6) proximate a second-end portion (5) for horizontal access of a cutting tool to work pieces on a work-piece rotator (10) and for horizontal access of the cutting tool to work pieces on an optional vertical-axis milling table (38) positioned on the horizontally pivotal vertical-axis trunnion (2). A work-piece changer (31) provides optionally manual or computer-coordinated work-piece setup, setup reversing and finished rotational work-piece removal.

BRIEF DESCRIPTION OF DRAWINGS

This invention is described by appended claims in relation to description of a preferred embodiment with reference to the following drawings which are explained briefly as follows:

FIG. 7 is a top view of a dynamic rotary table on a vertical-axis trunnion pivoted for horizontal access of tooling on a traveling tool column to an end of a work piece rotated or rotary-table positioned on the dynamic rotary table.

FIG. 8 is a partially cutaway side view of the FIG. 9 illustration.

FIG. 9 is a partially cutaway section view from line 9-9 of FIG. 8 showing a vertical axis trunnion having a tandem rotator with a centrally positioned work piece holder pivoted for horizontal access of tooling on a traveling tool column to an end of a work piece positioned on the tandem rotor.

FIG. 10 is a top view of a dynamic rotary table with a dynamic-table combination on a vertical-axis trunnion pivoted for horizontal access of tooling on a traveling tool column to an end of a work piece rotated or rotary-table positioned on the dynamic-table combination.

FIG. 11 is a partially cutaway section view from line 11-11 showing a vertical-axis trunnion having an optionally dynamic rotary table or tandem rotator having a dynamic-table combination with a work-piece platter pivoted for horizontal access of tooling on a traveling tool column to a dynamic-table combination.

FIG. 12 is a partially cutaway section view from line 11-11 of FIG. 10 showing a vertical-axis trunnion having an optionally dynamic rotary table or tandem rotator having a tandem-table combination with a work-piece platter pivoted for horizontal access of tooling on a traveling tool column to a tandem-table combination.

FIG. 20 is a first-end view of the FIG. 18 illustration.

FIG. 21 is a section view of the FIG. 18 illustration from line 21-21 of FIG. 19.

DESCRIPTION OF PREFERRED EMBODIMENT

Figure 1:
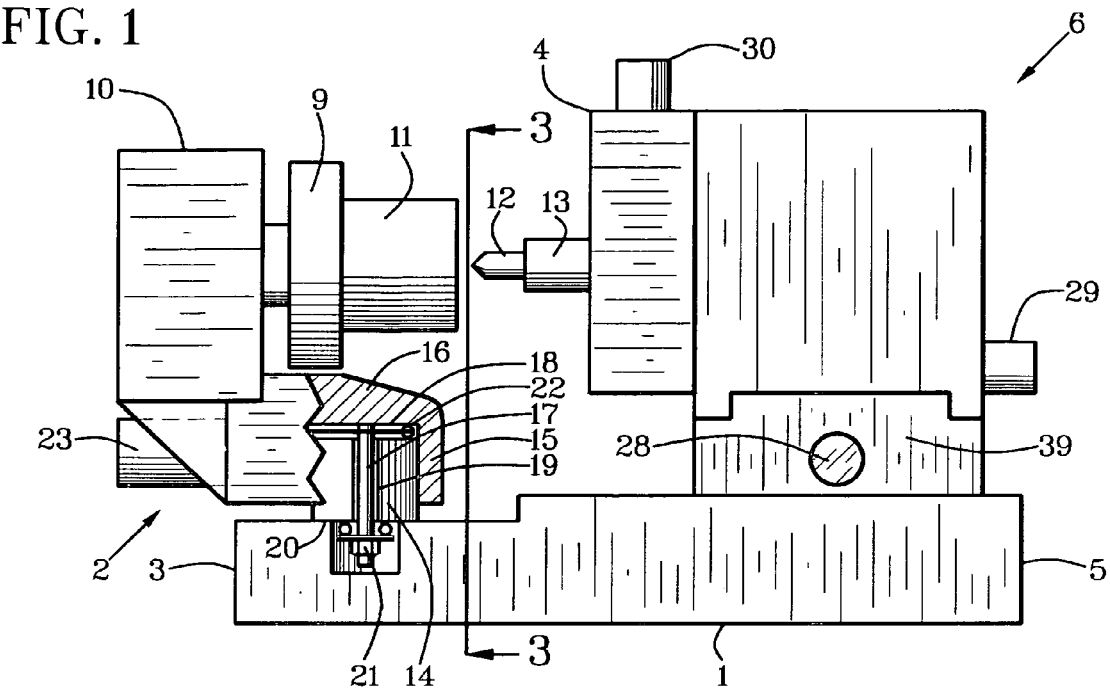
FIG. 1 is a partially cutaway side view with a vertical-axis trunnion pivoted to horizontal access of an end of a work piece in a work-piece holder on a work-piece rotator by tooling on a traveling tool column.
Figure 2:
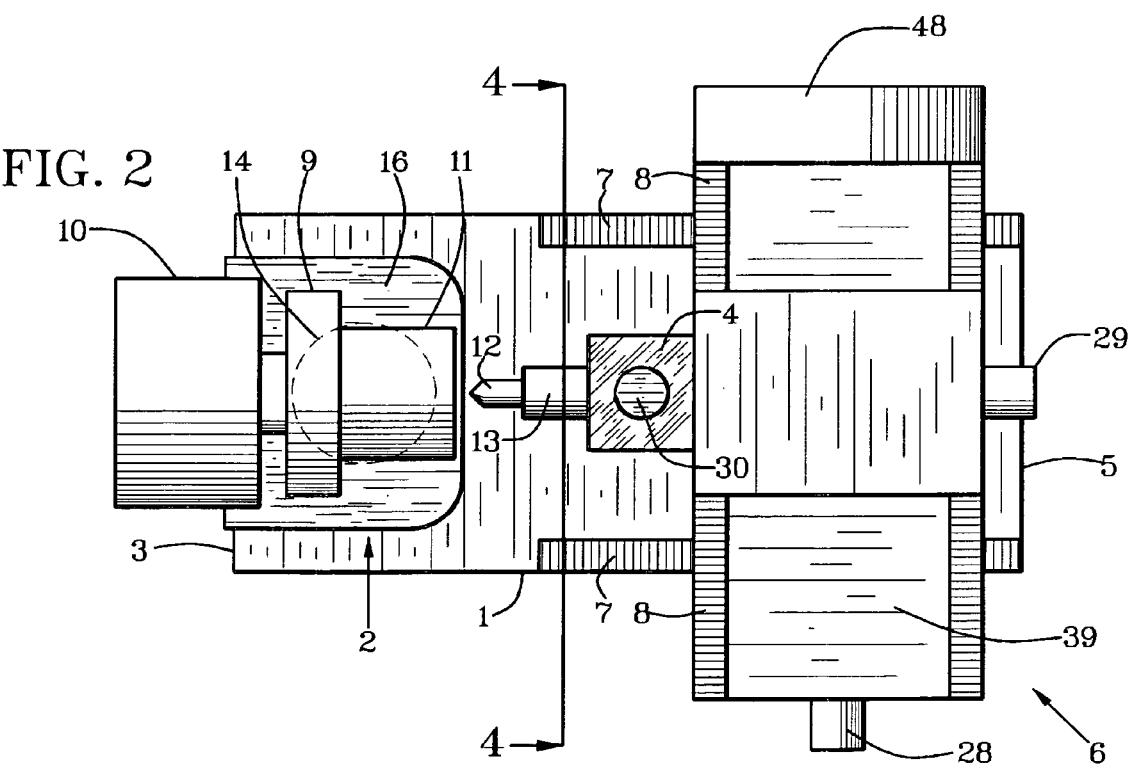
FIG. 2 is a partially cutaway top view of the FIG. 1 illustration.
Figure 3:
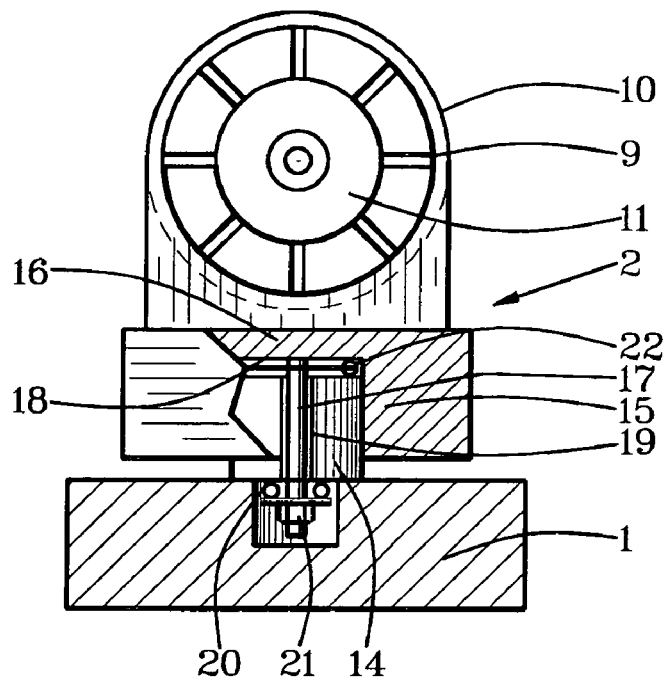
FIG. 3 is a partially cutaway sectional view of a first end of a horizontal machine bed with a vertical-axis trunnion from line 3-3 of FIG. 1 for showing the vertical-axis trunnion.
Figure 4:
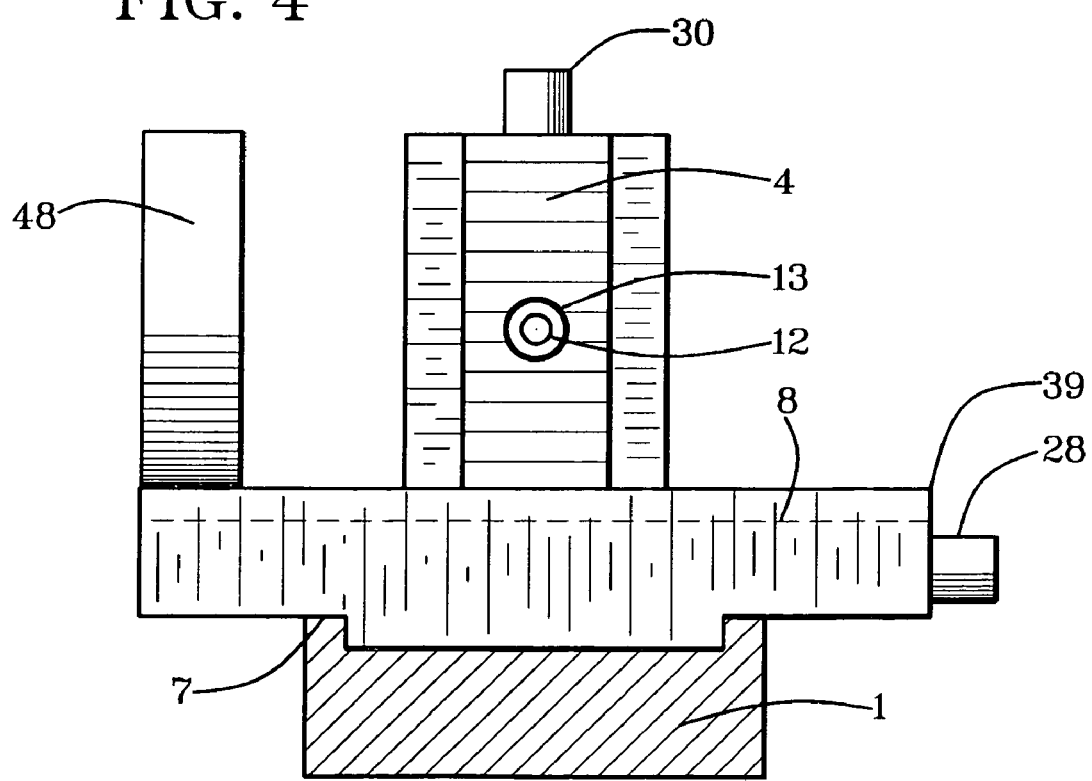
FIG. 4 is a partially cutaway section view of a second end of a horizontal machine bed from line 4-4 of FIG. 2 for showing a traveling tool column on a compound slide.

Reference is made to drawing FIGS. and to specific FIGS. as indicated. A description of a preferred embodiment of this invention has numbered terms which designate features of the invention with the same numbers on the drawings and in parentheses throughout the description and throughout the patent claims.

A complete machining center has a horizontal machine bed (1) with a vertical-axis trunnion (2) pivotal horizontally proximate a first-end portion (3) of the machine bed (1) and a traveling tool column (4) having horizontal X and Y travel proximate a second-end portion (5) of the horizontal machine bed (1).

The traveling tool column (4) is positioned vertically on a compound slide (6) having X-axis linear travel with the X-axis travel actuated by an X-axis motor (28) and by Y-axis cross travel with the Y-axis travel actuated by a Y-axis motor (29) selectively.

The vertical-axis trunnion (2) has a work-piece holder (9) rotatable by a work-piece rotator (10). The vertical-axis trunnion (2) is rotatable horizontally for selectively fixed and rotational positioning of a work piece (11) with the vertical-axis trunnion (2) for selective horizontal access by a selected cutting tool (12) attached to a tool positioner (13) on the traveling tool column (4).

The tool positioner (13) is moveable vertically in a Z-axis travel on the traveling tool column (4) by a Z-axis motor (30).

The vertical-axis trunnion (2) is rotatable in a horizontal plane on a vertical trunnion axle (14) positioned vertically proximate the first-end portion (3) of the horizontal machine bed (1). The vertical-axis trunnion (2) has a sleeve bearing (15) with an inside periphery positioned rotatably about an outside periphery of the vertical trunnion axle (14).

The sleeve bearing (15) has a bearing cover (16) to which the work-piece rotator (10) is affixed.

An anchor member (17) is extended from a bottom side (18) of the bearing cover (16) and through an anchor orifice (19) in the vertical trunnion axle (14) to an anchor surface (20) on the horizontal machine bed (1). A fastener member (21) is positioned on the anchor member (17) in rotatable contact with the anchor surface (20) for arresting upward travel of the anchor member (17), the bearing cover (16) and the work-piece rotator (10).

At least one set of roll-contact bearings (22) can be positioned intermediate the bearing cover (16) and the vertical trunnion axle (14) for reducing friction of rotational contact between the sleeve bearing (15) and the vertical trunnion axle (14). The roll-contact bearings (22), if utilized optionally, can be any of a wide selection of ball, roller or beveled roller bearings. Friction bearings without the roll-contact bearings (22) also can be employed for some use conditions. Pivotal rigidity without vibration is critical for any bearing system employed.

A trunnion rotation-control motor (23) is positioned on the vertical-axis trunnion (2) and geared for pivotal control of the vertical-axis trunnion (2) and the sleeve bearing (15) on the vertical trunnion axle (14) for pivotal control and rotational positioning of the vertical-axis trunnion (2) selectively.

Figure 5:
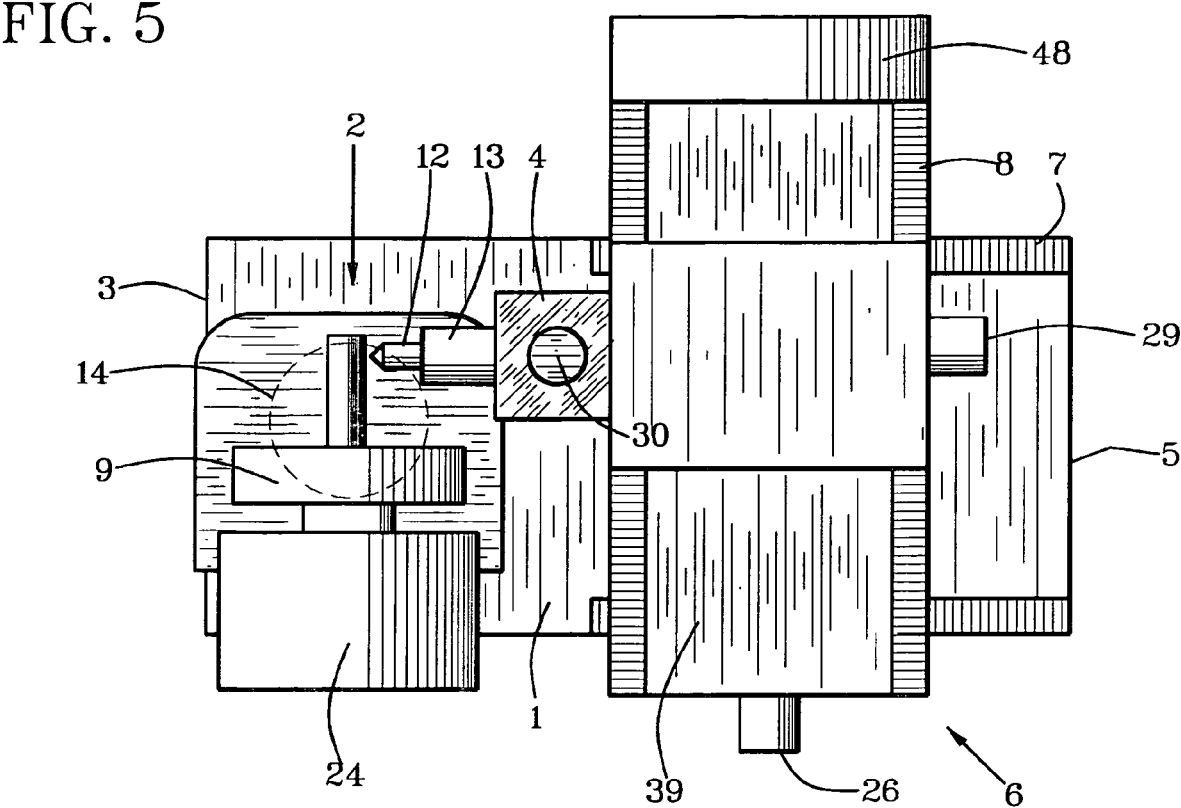
FIG. 5 is a partially cutaway top view with a vertical-axis trunnion pivoted for positioning a work-piece rotator on a second side of a horizontal machine bed for horizontal access of optional tooling on the traveling tool column.
Figure 6:
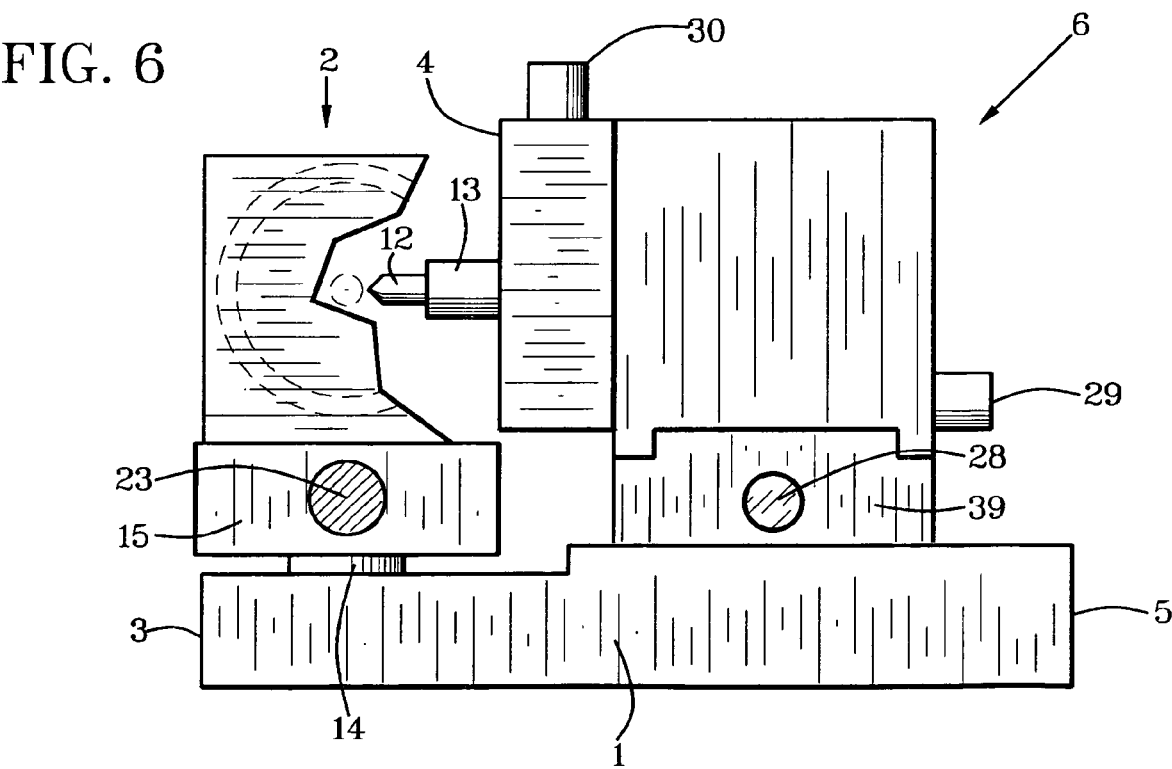
FIG. 6 is a partially cutaway side view of the FIG. 5 illustration.

As shown in FIG. 5, the work-piece rotator (10) can include a lathe motor (24) having a rotational axis positioned horizontally for rotational actuation of the work-piece holder (9).

As shown in FIG. 10, the work-piece rotator can include a rotary table (25) having a rotational axis positioned horizontally for rotational actuation of the work-piece holder (9).

As shown in FIG. 7, the work-piece rotator can include a dynamic rotary table (26) convertible controllably to lathe mode and to motorized rotary-table mode. The lathe mode has lathe-speed rotation and the motorized rotary-table mode has rotary-table speed rotation and rotary-table positioning for rotational actuation of the work-piece holder (9) selectively.

Figure 16:
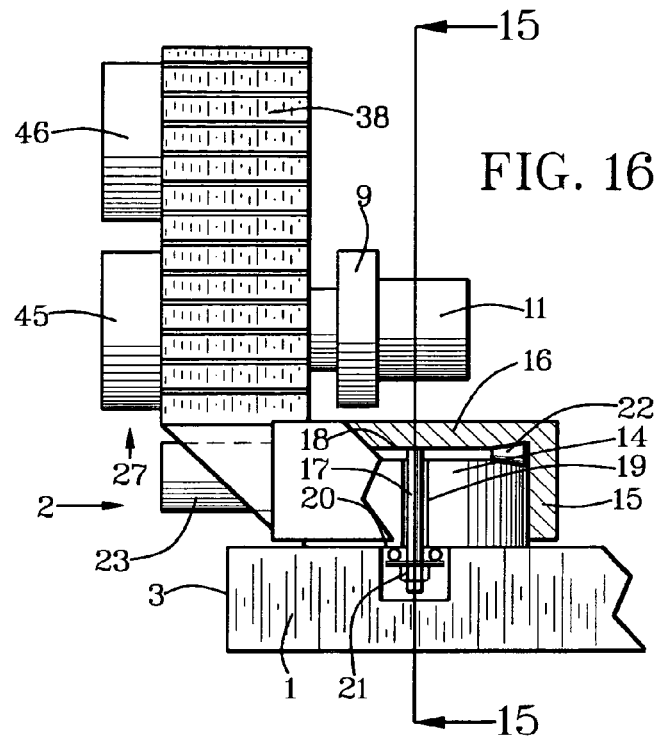
FIG. 16 is a partially cutaway fragmentary side view of the FIG. 15 illustration.
Figure 17:
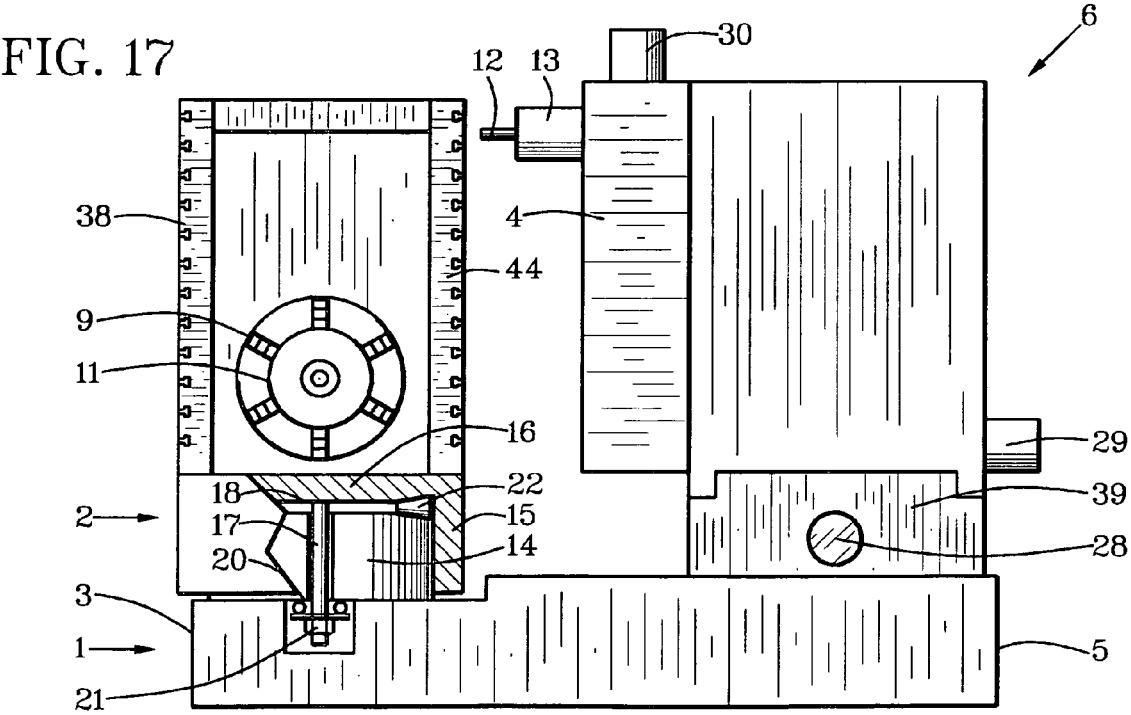
FIG. 17 is a partially cutaway side view of a vertical-axis trunnion having a vertical milling table on each side of a tandem rotator rotated for horizontal access of tooling on a traveling tool column to a first vertical milling plate.
Figure 18:
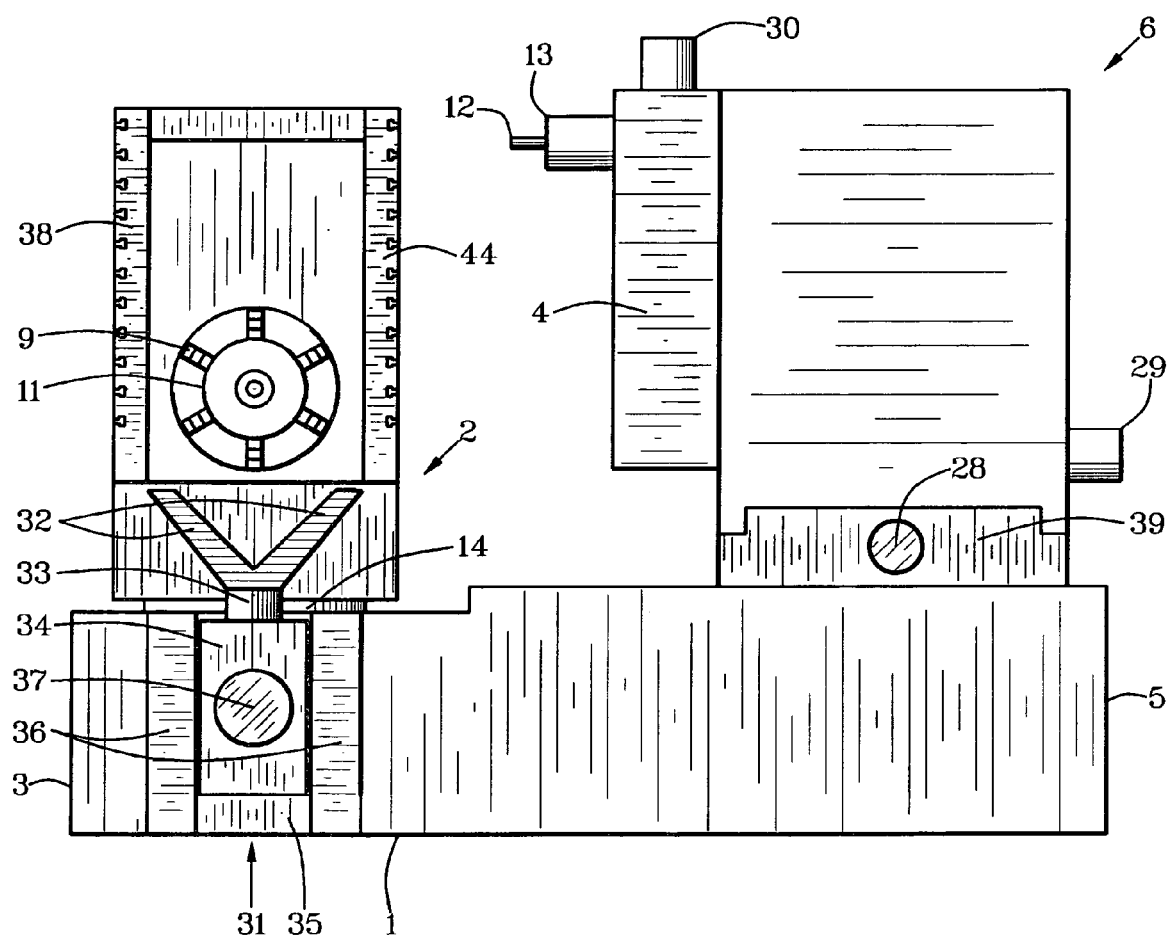
FIG. 18 is a first-side view of a work-piece changer in combination with a work-piece holder intermediate two vertical milling tables and with a traveling tool column having a tool positioner poised for horizontal access of a tool to either a work piece affixal to a vertical milling table or to a work piece in a work-piece holder.
Figure 19:
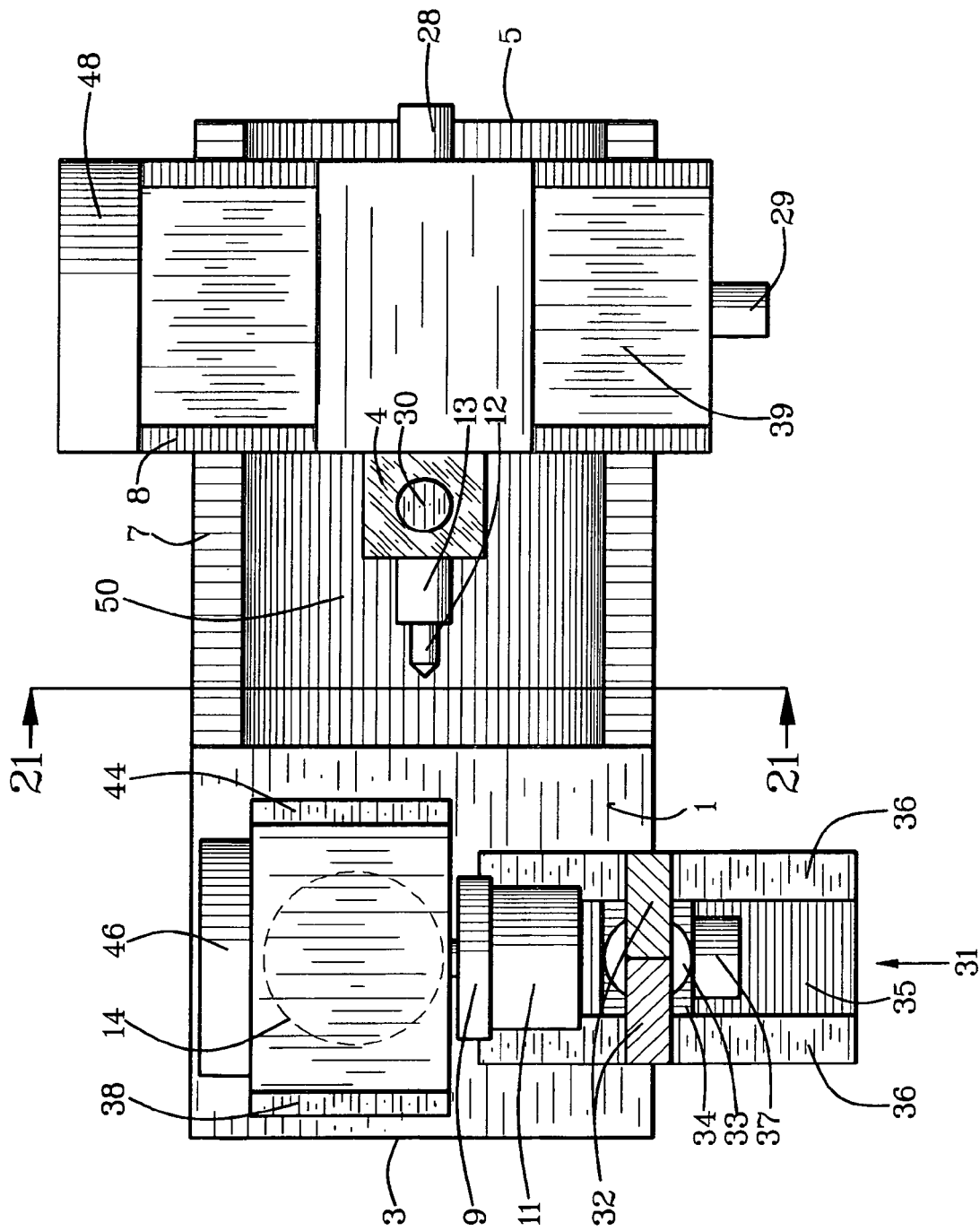
FIG. 19 is a top view of the FIG. 18 illustration.

As shown in FIG. 16, the work-piece rotator can include a tandem rotator (27) having a bottom motor (45) and a top motor (46) which are geared for separate actuation of the work-piece holder (9). The bottom motor (45) can be either the lathe motor (24) or the motorized rotary table (25).

The trunnion rotation-control motor (23), the work-piece-rotator (10), the X-axis motor (28), the Y-axis motor (29) and the Z-axis motor (30) are preferably programmable for coordinated computer control selectively. This allows up to six-axes machining.

Referring to FIGS. 18-21, a work-piece changer (31) can be positioned on a side of the horizontal machine bed (1). Preferably, the work-piece changer (31) is structured for mechanically receiving a work piece (11) prior to, while and after the work piece is positioned in the work-piece holder (9). The work-piece changer (31) can be used for assisting manual or selectively automated reversing of the work piece (11) and for repositioning the work piece (11) in the work-piece holder (9) selectively. The work-piece changer (31) can have retainer arms (32) slanted upwardly and outwardly from an elevation shaft (33) positioned rotatably and actuated vertically in a changer housing (34). The changer housing (34) is slidable horizontally in a housing slide (35). The housing slide (35) has slide walls (36) positioned collinear to an axis of the work-piece rotator (10) which is positioned perpendicular to the horizontal machine bed (1). A motorized change controller (37) can be positioned on the work-piece changer (31) for height control, rotational control and horizontal positioning of the work-piece changer (31).

A vertical milling table (38) can be affixed to at least one side of the vertical-axis trunnion (2) for attachment of fixed work pieces in positions on the vertical milling table (38). This allows horizontal-milling access by a select cutting tool (12) on the traveling tool column (4). The vertical milling table (38) can be attached detachably as a pallet.

Manufacture of a complete machining method has the following steps:

providing a vertical-axis trunnion (2) proximate a first-end portion (3) of a horizontal machine bed (1);
providing a compound slide (6) proximate a second-end portion (5) of the horizontal machine bed (1);
positioning X-axis ways (7) of the compound slide (6) on the second-end portion (5) of the horizontal machine bed (1);
positioning Y-axis ways (8) of the compound slide (6) on a slide base (39) of the compound slide (6);
providing a traveling tool column (4) vertically upright on the compound slide (6);
providing a work-piece rotator (10) on the vertical-axis trunnion (2);
providing a vertical-axis milling table (38) on at least one side of the vertical-axis trunnion (2); and
providing a tool positioner (13) with motorized vertical travel on the traveling tool column (4) for positioning a cutting tool (13) for horizontal access to a work piece (1) on the work-piece holder (9) and to fixable work pieces on the vertical-axis milling table (38) selectively.

The method can include:
providing a trunnion-rotation-control motor (23) having computerized control positioned on the vertical-axis trunnion (2);
the work-piece rotator (10) having computerized control;
the compound slide (6) having computerized control of X-axis travel with an X-axis motor (28);
the compound slide (6) having computerized control of Y-axis travel with a Y-axis motor (29);
the tool positioner (13) having computerized control of vertical travel with a Z-axis motor (30) and;
the trunnion-rotation-control motor (23), the work-piece rotator (10), the X-axis motor (28), the Y-axis motor (29), and the Z-axis motor (30) being computer-coordinated for computer control selectively.

The method can include: providing a work-piece changer (31) having a motorized change controller (37) proximate the vertical-axis trunnion (2) for motorized work-piece positioning in the work-piece holder (9), for work-piece reversing in the work-piece holder (9) and for work-piece removal from the work-piece holder (9) selectively.

The method can include:
providing a motorized change controller (37) computer-coordinated with the trunnion-rotation-control motor (23), the work-piece rotator (10), the X-axis motor (28), the Y-axis motor (29) and the Z-axis motor (30) for motorized work-piece positioning in the work-piece holder (9), for work-piece turning in the work-piece holder (9), for work-piece milling in the work-piece holder (9), for work-piece reversing in the work-piece holder (9) and for work-piece removal from the work-piece holder (9) selectively.

Referring to FIGS. 2, 4, 5, 7, 10, 13, 19 and 21, an automatic tool changer (48) can be positioned proximate the compound slide (6) in accordance with conventional practices for CNC automated horizontal machine tools.

This invention is intended to include working relationship of parts for a complete machining center and methodology for its manufacture, not conventional detail of the parts nor the conventional detail and operation of the conventional parts. Detail of tool changers, motors, ball screws, compound slides, chucks and other conventional parts, therefore, are not claimed nor described for this invention.

Novelty taught by this invention for making its new working relationship of parts work as a complete machining center, however, are described in essential detail.

Reference is made to the vertical-axis trunnion (2) shown in FIGS. 1, 3, 8, 9, 11, 12, 14, 15, 16, 17, 22 and 23. Any appropriately engineered axle and bearing technology for achieving controllably pivotal positioning of the vertical-axis trunnion (2) is intended for this invention. For best results, however, the sleeve bearing (15) with the bearing cover (16) is utilized for preventing contamination by cutting fluids, grinding dust and dirt generally while also preventing vibration. A selection of roll-contact bearings (22), all numbered the same, are shown as options for reducing friction, but are not essential to the invention. The invention is claimed with or without the roll-contact bearings (22). Shown as optional bearing types are ball and roller bearings with differently suitable bearing arrangements. Instead of the vertical trunnion axle (14) being extended upwardly from the horizontal machine bed (1) as shown, the vertical trunnion axle (14) can be extended downwardly from the vertical-axis trunnion (2) into a bearing bay in the horizontal machine bed (1).

Reference is made to the trunnion-rotation-control motor (23) shown in FIGS. 1, 6, 22 and 23. Utilization of conventional gearing for the trunnion-rotation-control motor (23) to the vertical trunnion axle (14) without detail explanation is intended.

Figure 22:
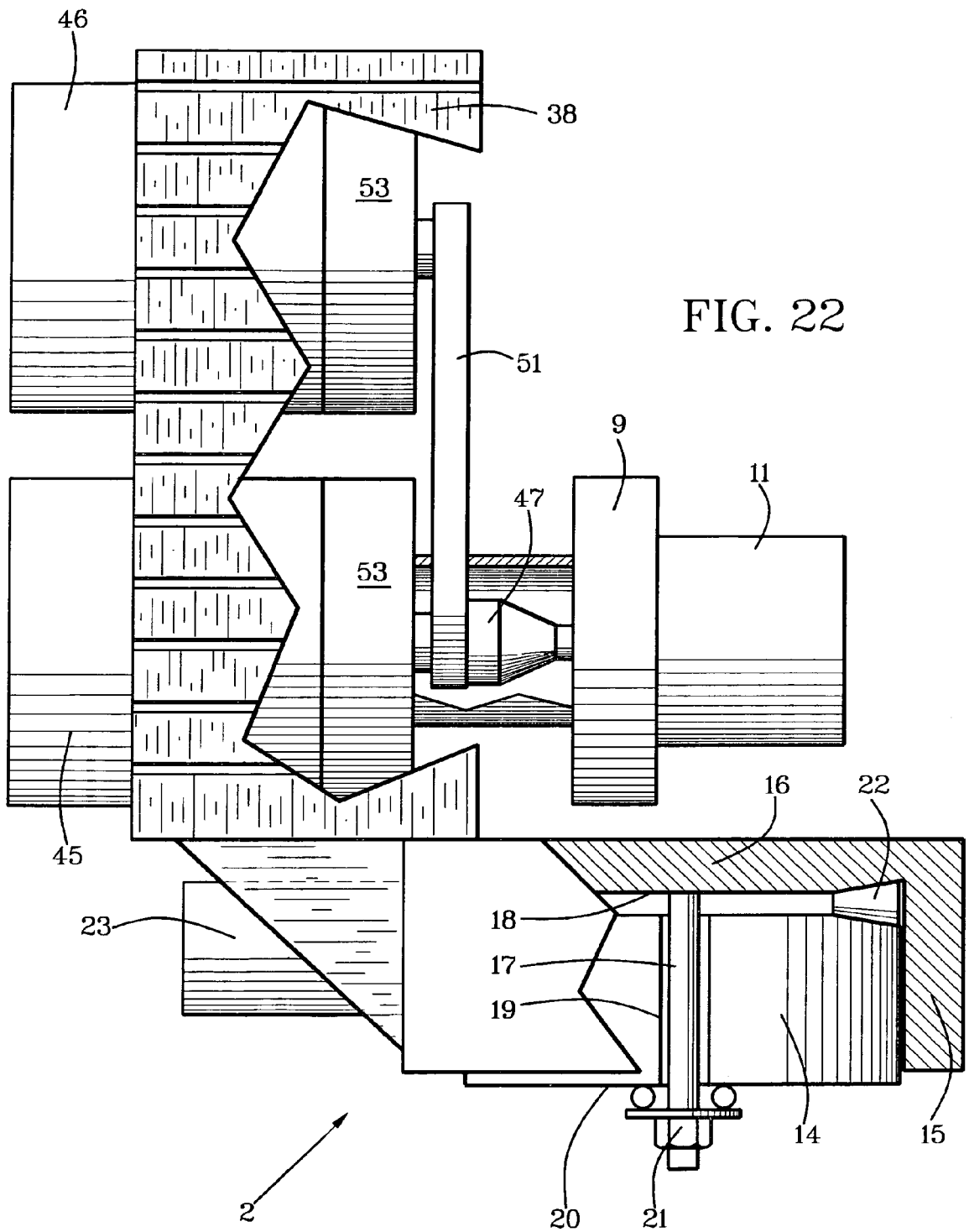
FIG. 22 is a partially cutaway fragmentary side view of a tandem rotator having a work-piece holder affixed to a bottom work-piece rotator and having a top work-piece rotator belt-geared to a holder gear.
Figure 23:
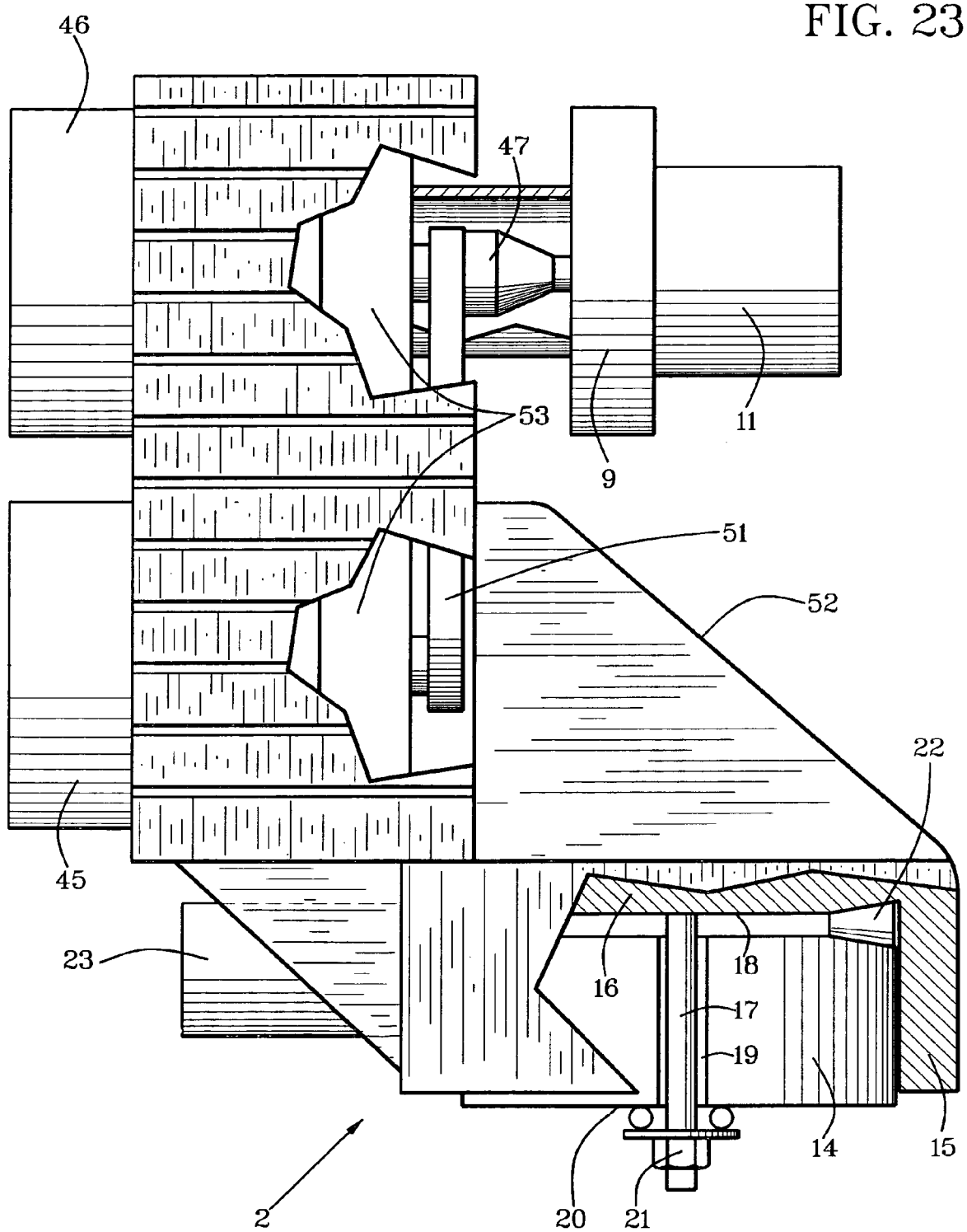
FIG. 23 is a partially cutaway fragmentary side view of a tandem rotator having a work-piece holder affixed to a top work-piece rotator and having a bottom work-piece rotator belt-geared to a holder gear.

Reference is made to FIGS. 1, 2, 5, 7, 9, 10, 13, 19, 20, 22 and 23 for showing variations of the work-piece rotator (10). The work-piece rotator (10) is intended to include either: a) a lathe motor which can be speed controlled with either a rotator gear (53) or variation of current supply, b) a rotary-table motor which is servo- or stepper-motor controlled, c) a dynamic rotary table (26) which is controllable between rotary-table mode and lathe-speed mode or d) a tandem rotator (27) which includes a rotary-table motor and a lathe motor juxtaposed in tandem with controllable gearing for separately controllable rotation of the work-piece holder (9) as shown in FIGS. 22-23. Motors being shaped so much the same, they are drawn the same.

Figure 13:
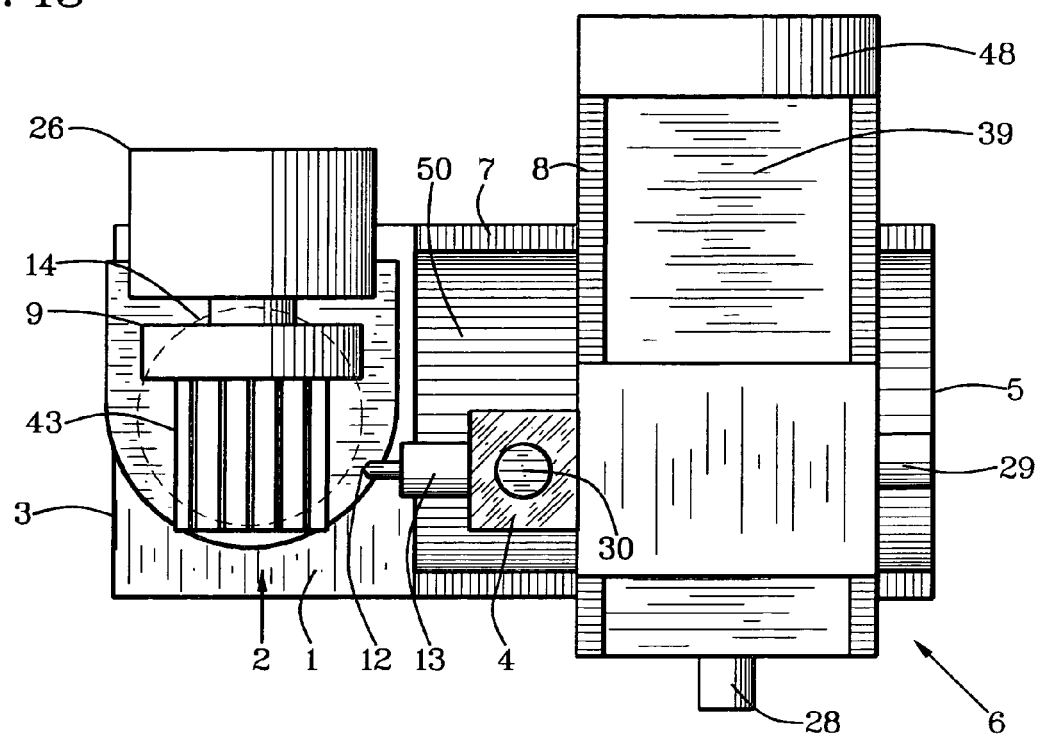
FIG. 13 is a top view of a dynamic rotary table with a horizontal tombstone on a vertical-axis trunnion pivoted for facing a first side of a horizontal machine bed for horizontal access of tooling on a traveling tool column to sides of the horizontal tombstone.
Figure 14:
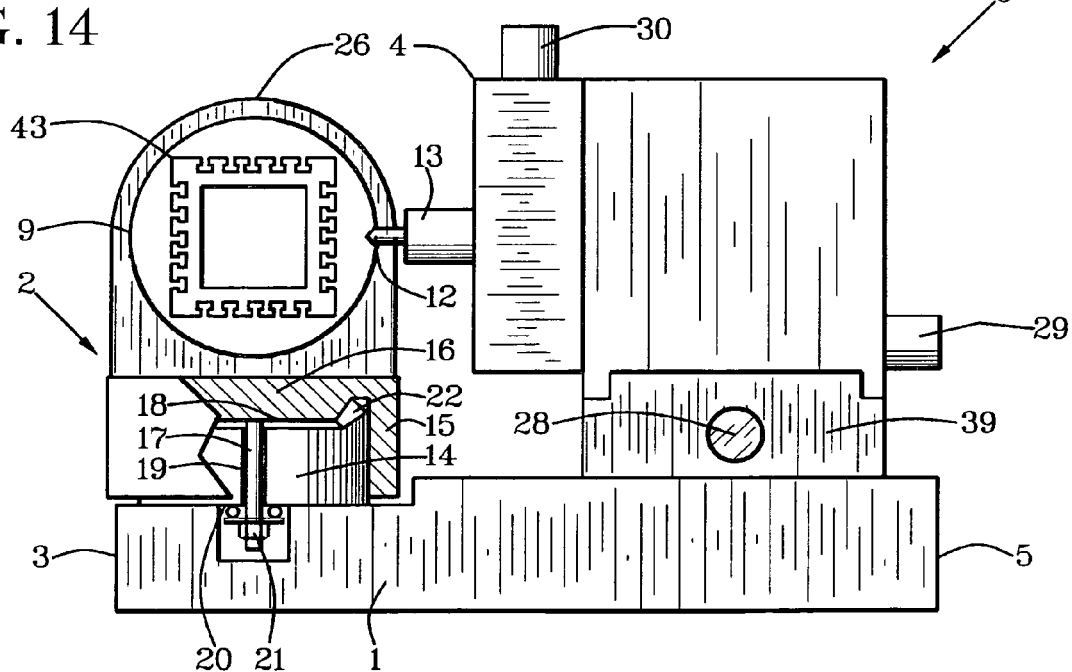
FIG. 14 is a partially cutaway side view of the FIG. 13 illustration.
Figure 15:
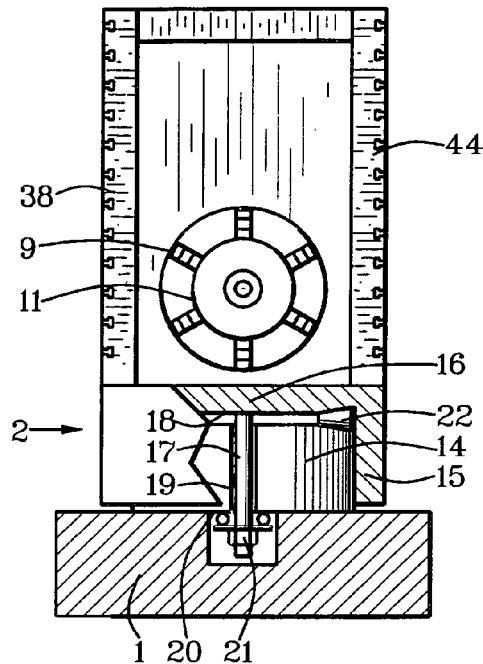
FIG. 15 is a partially cutaway section view from line 15-15 of FIG. 16 showing a vertical-axis trunnion having a vertical milling table on each side of a tandem rotator.

The tandem rotator (27) can be made most accurate for rotary-table work because it allows rotary-positional machine-scale or servo-motor accuracies of 1-to-3 arc seconds in comparison to normal accuracies of 20-to-30 arc seconds. Some users will prefer the high tandem-rotator (27) accuracies, while other users will prefer whatever accuracy per motor cost that can be achieved with the dynamic rotary table (26). Still other users or use conditions will not need rotary-table mode, such that the work-piece rotator (10) can be a dedicated lathe motor, although drawn the same as the dynamic rotary table (26). FIGS. 7, 10 and 13 show a dynamic rotary table (26).

In FIG. 22, a bottom work-piece rotator (45) is a rotary-table motor coupled directly the work-piece holder (9) for maximized rotary-table accuracy. In FIG. 23, a top work-piece rotator (46) is a rotary-table motor coupled directly the work-piece holder (9) for maximized rotary-table accuracy. Opposite positioning of the rotary-table motor is also included in this invention for particular user preferences. The tandem rotator (27) is intended for direct coupling of whichever rotator accuracy requirement is most preferred.

Referring to FIG. 23 and FIG. 21, a chip guide (52) can be employed for guiding chips to a chip trough (50) with the top work-piece rotator (46) being direct-coupled to the holder gear (47) and with rotation transmitted from the bottom work-piece rotator with a gear belt (51).

Referring to FIGS. 20-21, a chip exit (49) can be provided with communication from a chip trough (50). An optional chip auger which is not shown can be provides for conveying chips or cuttings out through the first-end portion (3) of the horizontal machine bed (1). The optional auger also allows for removing chips from either the first-end portion (3) or the second-end portion (5) of the horizontal machine bed (1).

Referring further to FIGS. 1 and 19-21, the bearing cover (16) can be designed with slant for guiding chips to a chip trough (50).

A new and useful complete machining center and method having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A complete machining center comprising:
a horizontal machine bed (1) having a vertical-axis trunnion (2) pivotally mounted for rotation about the vertical axis proximate a first-end portion (3) of the machine bed (1) and a traveling tool column (4) having horizontal X and Y travel proximate a second-end portion (5) of the horizontal machine bed (1);
the traveling tool column (4) being positioned vertically on a compound slide (6) having X-axis linear travel with the X-axis travel selectively actuated by an X-axis motor (28) and by Y-axis cross travel with the Y-axis travel selectively actuated by a Y-axis motor (29);
the vertical-axis trunnion (2) having thereon a work-piece holder (9) rotatable about a horizontal axis by a work-piece rotator (10);
the vertical-axis trunnion (2) being rotatable about the vertical axis by a trunnion rotation-control motor (23) positioned on the vertical-axis trunnion (2) for selectively fixed and rotational positioning of a work piece (11) with the vertical-axis trunnion (2) for selective horizontal access to the work piece (11) by a selected cutting tool (12) attachable to a tool positioner (13) on the traveling tool column (4) and;
the tool positioner (13) being moveable vertically in a Z-axis travel on the traveling tool column (4) by a Z-axis motor (30).

2. The complete machining center of claim 1 in which:
the vertical-axis trunnion (2) is rotatable on a vertical trunnion axle (14) positioned proximate the first-end portion (3) of the horizontal machine bed (1);
the vertical-axis trunnion (2) has a sleeve bearing (15) with an inside periphery positioned rotatably about an outside periphery of the vertical trunnion axle (14);
the sleeve bearing (15) having a bearing cover (16); and
the work-piece rotator (10) being affixed to the bearing cover (16).

3. The complete machining center of claim 2 in which:
an anchor member (17) is extended from a bottom side (18) of the bearing cover (16) and through an anchor orifice (19) in the vertical trunnion axle (14) to an anchor surface (20) on the horizontal machine bed (1); and
a fastener member (21) is positioned on the anchor member (17) in contact with the anchor surface (20) for arresting upward travel of the anchor member (17), the bearing cover (16) and the work-piece rotator (10).

4. The complete machining center of claim 3 in which:
at least one set of selected roll-contact bearings (22) is positioned intermediate the bearing cover (16) and the vertical trunnion axle (14) for reduction of rotational contact between the bearing cover (16) and the vertical trunnion axle (14).

5. The complete machining center of claim 4 in which:
the trunnion rotation-control motor (23) is in rotation control of the sleeve bearing (15) on the vertical trunnion axle (14) for selective rotational control and selective rotational positioning, respectively, of the vertical-axis trunnion (2).

6. The complete machining center of claim 3 in which:
the trunnion rotation-control motor (23) is in pivotal control of the vertical-axis trunnion (2) and the sleeve bearing (15) on the vertical trunnion axle (14) for selective pivotal control and selective rotational positioning of the vertical-axis trunnion (2), respectively.

7. The complete machining center of claim 6 in which:
the work-piece rotator (10) is a lathe motor (24) having a rotational axis positioned horizontally for rotational actuation of the work-piece holder (9).

8. The complete machining center of claim 6 in which:
the work-piece rotator is a rotary table (25) having a rotational axis positioned horizontally for rotational actuation of the work-piece holder (9).

9. The complete machining center of claim 6 in which:
the work-piece rotator is a dynamic rotary table (26) convertible controllably to lathe mode and to motorized rotary-table mode and;
the lathe mode having lathe-speed rotation and the motorized rotary-table mode having rotary-table speed rotation and rotary-table positioning for rotational actuation of the work-piece holder (9), respectively selectively.

10. The complete machining center of claim 6 in which:
the work-piece rotator is a tandem rotator (27) having a lathe motor (24) and a motorized rotary table (25) positioned and geared for separate and selective actuation of the work-piece holder (9) by the lathe motor (24) or the motorized rotary table (25).

11. The complete machining center of claim 6 in which:
the trunnion rotation-control motor (23), the work-piece-rotator (10), the X-axis motor (28), the Y-axis motor (29) and the Z-axis motor (30) are programmable for coordinated selective computer control.

12. The complete machining center of claim 11 in which:
a work-piece changer (31) is positioned on a side of the horizontal machine bed (1);
the work-piece changer (31) is structured for mechanically holding a work piece (11) prior to, while, and after the work piece is positioned in the work-piece holder (9), for reversing the work piece (11) and for repositioning the work piece (11) in the work-piece holder (9), selectively.

13. The complete machining center of claim 12 in which:

the work-piece changer (31) has retainer arms (32) slanted upwardly and outwardly from an elevation shaft (33) positioned rotatably and slidable vertically in a changer housing (34);

the changer housing (34) is slidable horizontally in a housing slide (35) and;

the housing slide (35) has slide walls (36).

14. The complete machining center of claim 13 in which:

a motorized change controller (37) is positioned on the work-piece changer (31) for height control, rotational control and horizontal positioning of the work-piece changer (31) for receiving, positioning and reverse-positioning a work piece (11) in the work-piece holder (10) and for removing a work piece (11) from the work-piece holder (10), selectively.

15. The complete machining center of claim 1 in which:

a vertical milling table (38) is affixed to at least one side of the vertical-axis trunnion (2) for attachment of fixed work pieces in positions on the vertical milling table (38) for horizontal-milling access by a selected cutting tool (12) on the traveling tool column (4).

16. The apparatus complete machining center of claim 15 in which:

the vertical milling table (38) is attached detachably as a pallet.

\* \* \* \* \*